W. G. FRITZ.
PNEUMATIC VEHICLE BODY SUPPORT AND AIR CONTROL.
APPLICATION FILED MAR. 1, 1920.
1,426,057.
Patented Aug. 15, 1922.
2 SHEETS—SHEET 1.
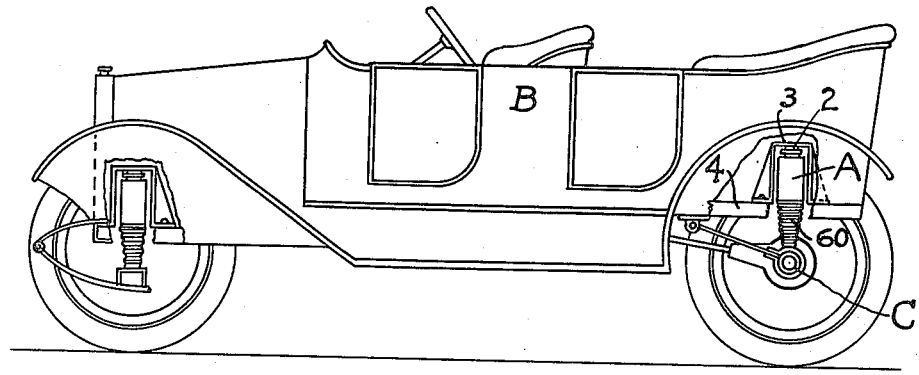
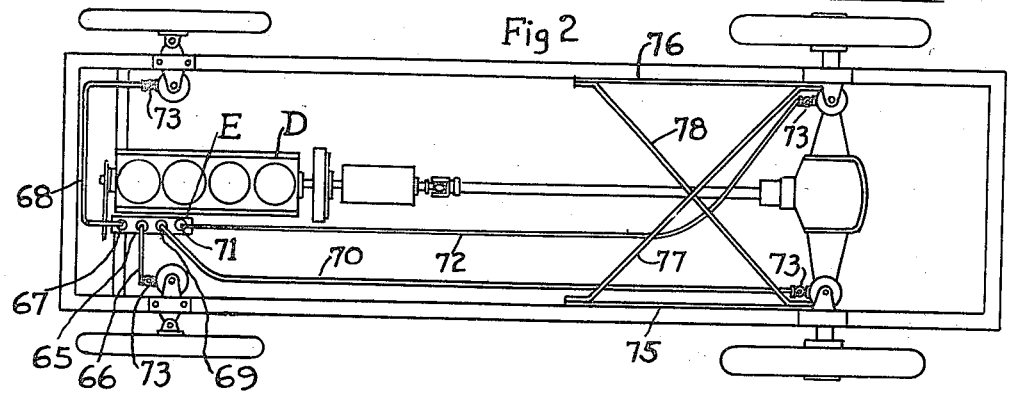
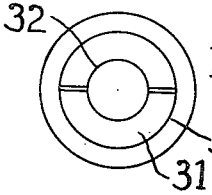
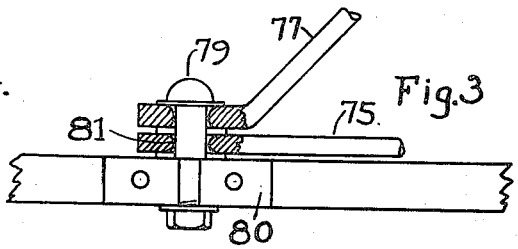
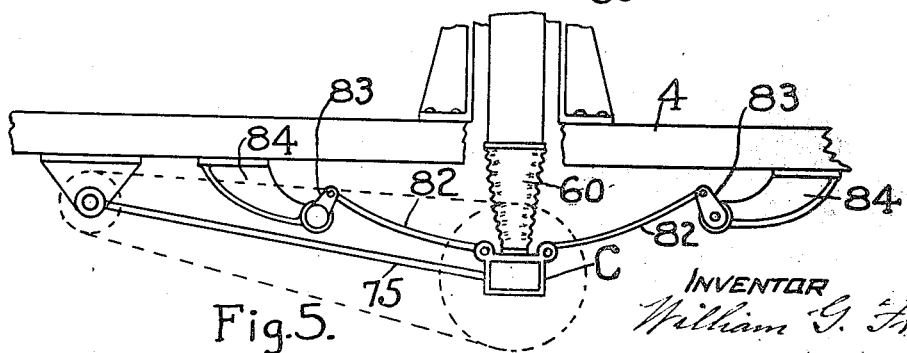
INVENTOR
William G. Fritz,
By Bradbury & Church
ATTORNEYS.

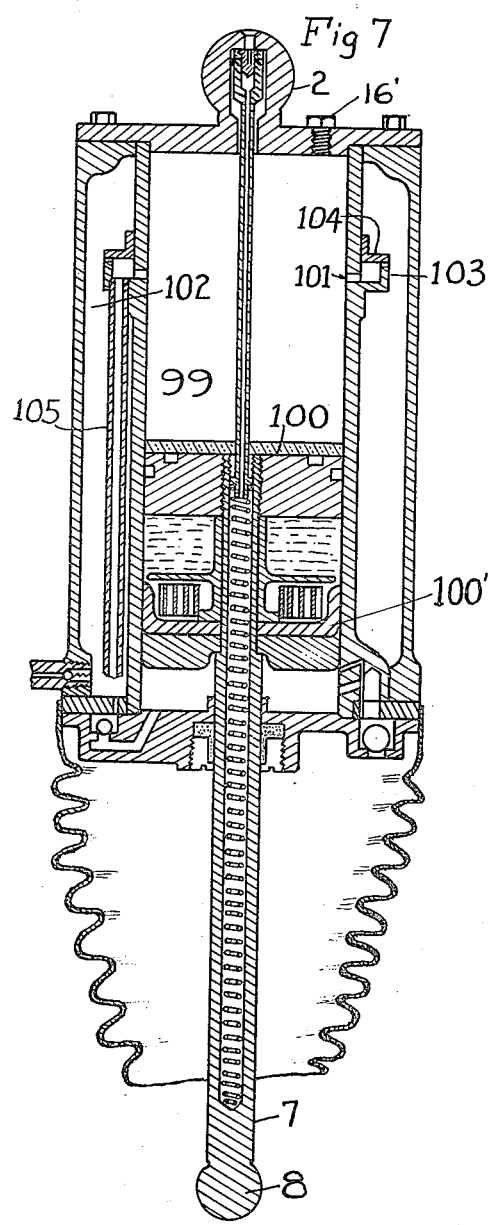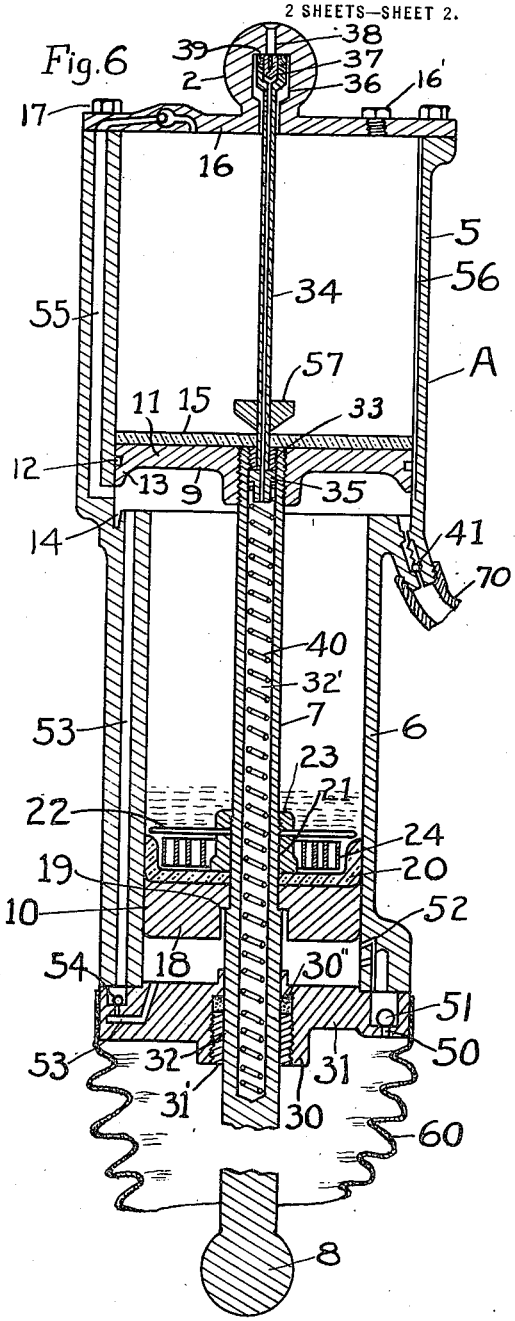

UNITED STATES PATENT OFFICE.

WILLIAM G. FRITZ, OF CLEAR LAKE, MINNESOTA.

PNEUMATIC VEHICLE-BODY SUPPORT AND AIR CONTROL.

1,426,057.  Specification of Letters Patent.  Patented Aug. 15, 1922.

Application filed March 1, 1920. Serial No. 362,407.

*To all whom it may concern:*

Be it known that I, WILLIAM G. FRITZ, a citizen of the United States, residing at Clear Lake, in the county of Sherburne and State of Minnesota, have invented a new and useful Improvement in Pneumatic Vehicle-Body Supports and Air Controls, of which the following is a specification.

This invention relates to a pneumatic vehicle body support and air control therefor. One of the objects of this invention is to provide a vehicle body support comprising a plurality of pneumatic supporting members, each of which is supplied with air from a separate compressor or other suitable source of pressure supply. Another object of the invention is to provide means for automatically and independently regulating the pressure within each pneumatic supporting member to conform correctly with the load, whereby greater and even more resiliency is produced than heretofore.

A further object is to provide means for automatically lubricating the working parts of each pneumatic supporting member, so as to reduce wear, reduce leaking and maintain the working parts most efficiently for the work which they perform, and so that they will without fail function. Further objects will hereinafter appear.

To these ends my invention comprises the features of construction and combination of parts as will hereinafter be more fully described and claimed.

In the accompanying drawings forming part of this specification, Fig. 1 is a side elevation of a car partly broken away showing the application of my invention; Fig. 2 is a plan view of a car showing the air connections between the several pneumatic supports and the compressor and also showing the lateral bracing for the radius rods; Fig. 3 is a detail partly in section showing the connections of the radius and lateral bracing rods; Fig. 4 is an end view of the stuffing box; Fig. 5 is a detail side elevation partly broken away showing a modified form of mechanism for supporting the pneumatic cushioning cylinder against lateral and endwise movement; Fig. 6 is a central vertical section through the cylinder of one of the pneumatic supporting members, and Fig. 7 is a central vertical section through one of the pneumatic supporting members of alternative construction.

In the accompanying drawings, let A represent a cylinder, which is connected at its upper end by means of a socket joint 2 with a supporting bracket 3 (see Fig. 1) secured on the frame 4 of the vehicle B. The upper end portion 5 (see Fig. 6) of the cylinder A is of larger diameter and shorter in length than the lower portion 6 and reciprocably mounted in the cylinder is a hollow piston rod 7, which is movably joined at its lower outer end with the axle C of the vehicle by means of a lower socket joint 8. Mounted upon the piston rod 7 is an upper piston 9 and a lower piston 10, which respectively reciprocate in the upper and lower portions of large and small diameter of the cylinder.

There are four cylinders with connected pistons as stated disposed between the body of the vehicle and the axles one adjacent to each corner, and these cylinders are provided with pneumatic supports which cushion the movement of the vehicle body and axles with relation to each other. Specially constructed pistons are provided in the present instance to prevent leakage of air as much as possible and to permit free restricted movement of the body. The piston 9 consists of a guide head 11 threaded on the piston rod 7 and provided in its periphery with a packing ring 12, which is fitted in the inner wall of the upper portion of large diameter of the cylinder. This piston head is also formed with a peripheral depending flange 13, which dips into a circular oil cup or well 14 formed in the upper end of the lower portion of the cylinder to receive oil and spread the same over the inner wall of the upper portion of the cylinder as the piston reciprocates. Placed upon the upper surfaces of the piston is a disk of resilient material 15, which acts as a bumper in the event the piston strikes against the upper end 16 of the cylinder which is detachably secured on the latter by means of the bolts 17.

The lower piston consists of a thick disk 18 placed over the piston rod 7 and resting upon a shoulder 19. Upon this disk is a leather cup 20, which is held down by a collar 21, a thin disk 22 placed over the piston rod and a nut 23 threaded on said rod and securing the parts together. Situated within the leather cup is a flat coil spring 24, which tends to expand outwardly and hold the peripheral side of the flexible cup tightly compressed against the inner wall of the lower portion of the cylinder to produce an air tight working joint between the piston and the cylinder, thus preventing leakage to a large extent at this point, and also automatically taking up any wear.

The piston rod slides freely in a hollow gland 30 (see Fig. 4) in the lower end 31 of the cylinder, said gland having a passage 32, split bushing 31' and packing 30'' through a portion of its length. Secured in the upper end of the piston rod is a guide bushing 33, through which hollow extension rod 34 slides. On the lower end of this rod is formed a stop or head 35. The upper end of said rod extends into a passageway 36 formed in the upper socket joint 2. A valve 37 is secured on the upper end of said rod, which is adapted to automatically close an opening 38, the valve 37 with rod 34 being normally held against a seat 39 by means of a coil spring 40 interposed between the head 35 and the lower end of the passageway 32' in the piston rod 7. This valve will hereinafter be known as the relief valve through which any excess air admitted to the cylinder through a check valve 41 may be exhausted.

Formed in the lower end of the cylinder is an air inlet port 50, which is normally closed by the ball check valve 51. This port enters the cylinder below the piston 10, and allows air to enter the cylinder from atmosphere upon the upward stroke of the piston. As the piston moves downward the ball closes and prevents escape of air. A small by-pass 52, permits part of this air to slowly escape as the piston moves downwardly. When the piston passes by-pass 52 it automatically shuts off the said outlet and the air then within cylinder serves as a positive cushion preventing the piston 10 from striking the cylinder head 31. The lower portion of the cylinder is formed with a passage 53, which forms a communication leading from within the cylinder below the piston 10 upwardly through the wall of the cylinder into the extreme upper end of the lower portion of the cylinder of small diameter, so as to allow the air when the piston 10 is descending to pass upwardly into the space above said piston and blow oil upwardly which leaks past the piston and collects in the lower end of the cylinder. A ball check valve 54 is arranged in the cylinder to automatically close the passage 53 to prevent the return of air from above the piston into the lower end of the cylinder. This upward circulation of air and oil through ducts 53 and 55 which is forced by the downward descent of the piston 10, sprays the oil or other lubricant contained in the well 14 on the inner wall of the upper portion of large diameter of cylinder to lubricate the latter and causes the oil to collect in the well 14. Oil is carried in the cylinder above the piston 10 to a depth of one inch more or less. The passage 55 enters the lower portion of the cylinder immediately above the well 14 and enters the portion of the cylinder of large diameter at its extreme upper end 16 to allow the air above to freely circulate downwardly and upwardly as the piston moves up and down. The upper chamber thus serves as a guide and expansion chamber. The passage 55 when desired may be constructed in the form of a longitudinal channel 56 in the wall of the cylinder for accomplishing the same results. A small diverter 57 placed on the rod 34 prevents the oil which accumulates in the hollow piston rod to be forced by the action of the valve stem and stop 35 from being thrown in a stream into the exhaust valve in the ball joint 2 and prevents the oil from blowing out with the air, thus saving lubricant and preventing a greasy appearance outside. Oil may be inserted in the cylinder to lubricate the surfaces between the piston and cylinder by a stoppered passage 16'.

Secured at the lower end of the cylinder and completely surrounding the same is a circular bellows covering 60, the lower end of which is suitably secured to the lower socket joint 8. This bellows covering forms a dust proof protection for the lower socket joint on the piston rod and stuffing gland and also acts as a strainer for the air which is admitted through the port 50 and exhausted through port passage 53, thus preventing any dust laden air from entering the cylinder.

In the application of the invention a cylinder A is connected with the vehicle frame (see Fig. 1) adjacent to each of the four corners of the latter in any suitable manner, but preferably connected to the standard 3 mounted upon the vehicle frame as shown in Fig. 2 and concealed within the vehicle body B. By this arrangement the device is hidden from view, thus obviating unsightly projections on the vehicle body. Suitably connected and operated by the engine D of the vehicle which in this instance represents a motor car, is an air compressor E of any suitable construction, in this case representing a four cylinder unit, each cylinder of which is connected through a pipe with a separate pneumatic supporting cylinder. This can be traced as follows:

Cylinder 65 is connected through a pipe 66 with the left hand forward pneumatic supporting cylinder; cylinder 67 of the compressor is connected through a pipe 68 with the right hand forward pneumatic supporting cylinder; cylinder 69 of the compressor is connected through a pipe 70 with the left hand rear pneumatic supporting cylinder; and cylinder 71 is connected through a pipe 72 with the right hand near pneumatic supporting cylinder. A check valve 73 is interposed between the end of each pipe and the cylinder to prevent any back pressure from being transmitted through the pipe connections to the compressor. A separate compressor is thus provided for each pneumatic supporting member. This is of great importance as will later be described.

The cylinders and piston rods are pivotally and universally connected with the vehicle body B and axle C of the car as at 2 and 8 respectively. It is necessary to provide means for preventing lateral and longitudinal movement of the vehicle body with relation to the axle C. A pair of rearwardly extending radius rods 75 and 76 are provided to prevent longitudinal movement while a pair of diagonally disposed rods 77 and 78 are provided to prevent lateral movement. Radius rod 75 is secured in the usual manner to the rear axle while the upper end of said rod is pivotally mounted on a pin 79 carried by a bearing member 80. The upper end of the diagonal cylinder brace rod 77 is similarly pivotally connected on pin 79. All of the connections are formed in this manner. To permit the rear axle to assume an angular position with relation to the vehicle frame or body without providing socket joints, the ends of the radius rods and diagonal lateral rods are slightly rounded as at 81 to give sufficient play. Each diagonal rod may in turn be slightly bowed in opposite directions to permit movement of one rod with relation to the other. The axle may be connected to the body frame 4 by a pair of arms 82 pivotally attached to the axle and to a pair of links 83, which in turn are pivotally attached to supports 84 on said body frame.

In the construction shown in Fig. 7, the expansion chamber 102 surrounds the main chamber 99 instead of being superimposed as in Fig. 6. As the piston moves upwardly the air between piston 100 and port 101 is expelled into the outer chamber 102 and when air pressure forces the piston 100 downwardly the reverse action occurs. A hollow circular ring 103 acts as an oil well. The upper portion 104 of this well acts as a check valve being raised by air to permit air to escape to the outer chamber, but as air pressure again forces the piston downward the valve 104 falls into place and closes, compelling air to enter the upper portion 99 of the cylinder through pipe 105. Oil is placed in the space between the two pistons 100—100'. By this construction the length of space required is shortened over that illustrated in Fig. 6.

In operation air pressure is maintained sufficient to force the pistons and cylinders in a direction apart as the load tends to press them together. Thus the whole load is carried by the air under pressure. Any rebound is compensated by the air taken in port 50 and as the piston moves downwardly part of the air which has entered through port 50 escapes through the by-pass 53. Thus a resilient structure supported by air carries the weight of the car making the car ride smoothly. The valve 37 is in the form of a packing made of fiber or other suitable material which will muffle any sound caused by air escaping through the valve. Lubrication is efficiently produced by the structure described without attention of an operator, a sufficient quantity being placed in the device to last a long time. There is substantially no waste of oil and the joints are sealed against leakage by it.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A pneumatic vehicle body support comprising a cylinder, a piston reciprocably mounted within said cylinder, means connecting the cylinder with the vehicle body, means adapted to connect the piston with the vehicle running gear, means for admitting air under pressure to the cylinder to form a pneumatic cushion between the cylinder and piston, a spring actuated relief valve mounted in the cylinder, means connected with and controlled by the position of the piston for opening said valve, said means comprising a rod connected at its upper end to the valve and having its lower end slidably mounted in the piston, a stop secured on the lower end of the rod, and means above said stop on said rod for deflecting the upward course of oil around said rod.

2. A pneumatic vehicle body support comprising a cylinder, a piston reciprocably mounted within said cylinder, an upper socket joint adapted to connect the cylinder to the vehicle body, a piston rod having a socket joint formed on its lower end connecting the piston with the vehicle running gear, means for admitting air under pressure to said cylinder to form a cushion between the cylinder and piston, a passage extending through the upper socket joint communicating at its lower end with the interior of the cylinder and having a relief valve mounted therein, means connected with the piston for opening said valve, and a chamber formed in said socket joint adapted to receive a packing to break up and muffle any sound caused by air escaping through the valve.

3. A pneumatic support for vehicle bodies comprising a cylinder and piston adapted to be interposed between the body and running gear of a vehicle, said cylinder being connected with an air compressing means, said air to form a cushion between the cylinder and piston, a relief port in the upper end of the cylinder to insure a pressure proportional to the load which is opened or closed by the movement of the cylinder and piston with relation to each other, a valved port entering the cylinder to admit into a compression chamber below said piston and an expansion chamber with which said compression chamber is connected.

4. The combination with a vehicle body and axle, of a double-acting pneumatic cushioning device comprising a cylinder, a double piston reciprocable in the cylinder having its piston elements rigidly connected, said piston dividing the cylinder into a connected compression chamber, an expansion chamber, and a lowermost air inlet chamber, an air inlet valve connected with said compression chamber, means for checking the escape of air from said compression chamber, means for regulating the air pressure in the expansion chamber, a valved duct leading from the lowermost chamber and entering said compression and expansion chambers and an oil well in proximity to said duct.

5. A pneumatic support comprising a cylinder, upper and lower interspaced and rigidly connected pistons in said cylinder adapted to receive lubricating liquid therebetween, means for delivering air under pressure from below the lowermost piston into the cylinder above the upper piston, a valved duct leading out of said cylinder above said upper piston and an air relief valved duct for excess air pressure between the spaces above and below said upper and lower pistons.

6. A pneumatic support comprising a cylinder, upper and lower interspaced and rigidly connected pistons in said cylinder, means for delivering air under pressure into the cylinder above the lower piston, means for conveying said air under pressure into the space above the upper piston, said uppermost space forming an expansion chamber and a ball joint on the upper end of said cylinder having a valved duct entering said uppermost space.

7. A pneumatic support comprising a cylinder, upper and lower interspaced and rigidly connected pistons in said cylinder, means for delivering air under pressure into the cylinder above the lower piston, means for conveying and expanding said air under pressure to the space formed above the upper piston, and means controlled by the lower piston for regulating the air pressure in the cylinder to conform with a variable load.

8. A pneumatic support comprising a cylinder, upper and lower interspaced and rigidly connected pistons in said cylinder, valved means for delivering air under pressure into the cylinder below the lower piston, valved means for conveying said air under pressure to the space formed between the upper and lower and to the space above the upper piston, and means controlled by the pistons for regulating the air pressure in the cylinder to conform with a variable or changeable load.

9. A pneumatic support comprising a cylinder, upper and lower interspaced and rigidly connected pistons in said cylinders, means for delivering air under pressure into the cylinder above the lower piston, means for conveying and expanding said air under pressure to the space formed above the upper piston, means controlled by the lower piston for regulating the air pressure in the cylinder to conform with a variable load, an air inlet valve in the lower end of the cylinder below the lower piston, an exhaust port, and a by-pass.

In testimony whereof, I have signed my name to this specification.

WILLIAM G. FRITZ.